United States Patent [11] 3,560,722

[72] Inventor Hanspeter Kupfer
 Dietikon, Switzerland
[21] Appl. No. 691,615
[22] Filed Dec. 18, 1967
[45] Patented Feb. 2, 1971
[73] Assignee Albiswerk Zurich A.G.
 Zurich, Switzerland
 a corporation of Switzerland
[32] Priority Jan. 19, 1967
[33] Switzerland
[31] 808/67

[54] APPARATUS FOR DETERMINING AND
 INDICATING A DIGITAL MEASURING RESULT
 4 Claims, 4 Drawing Figs.
[52] U.S. Cl. .................................................. 235/92;
 318/18; 340/347
[51] Int. Cl. ..................................................... G06m 3/08
[50] Field of Search ........................................... 235/92;
 318/20; 340/347

[56] References Cited
 UNITED STATES PATENTS
3,440,410 4/1969 Offereins ..................... 235/92

Primary Examiner—Maynard R. Wilbur
Assistant Examiner—Joseph M. Thesz, Jr.
Attorney—Jacobi, Davidson and Kleeman ABSTRACT: An apparatus for determining and indicating a final digital-measuring result or value obtained from a series of partial measurements. Each partial measurement can include more than one cipher or place and can be those obtained by coarse, fine, and very fine measurements. Further, one cipher or place of a coarser measurement overlaps a cipher or place of a finer measurement to thus be twice determined. The result obtained by a coarser measurement is accordingly corrected by that obtained by a finer measurement through the utilization of an auxiliary counting stage in the following manner. Initially, the coarser partial measurement storage means is preset to a value of −5 or −6 prior to measurement of the coarser value. The coarser value is then counted-in. The finer value is then counted into the finer partial measurement storage means with the value of the twice-determined or overlapping cipher or place of the finer partial measurement being also counted into the auxiliary counter stage. The difference between 10 and the value stored in the auxiliary counting stage is then fed into the coarser partial measurement storage means. In this manner, the second finest cipher or place in the coarser partial measurement storage means is corrected by normal counter transfer or carryover. The value of the finest cipher or place in the coarser partial measurement storage means is not indicated.

RESULTS OF THE COUNTING OPERATIONS

Fig. 1 a (COARSE VALUE)

| b (FINE VALUE) | 0 | 1 | 2 | 3 | 4 | 5 | 6 | 7 | 8 | 9 |
|---|---|---|---|---|---|---|---|---|---|---|
| 0 | 5 | 6 | 7 | 8 | 9 | 10 | 11 | 12 | 13 | 14 |
| 1 | 4 | 5 | 6 | 7 | 8 | 9 | 10 | 11 | 12 | 13 |
| 2 | 3 | 4 | 5 | 6 | 7 | 8 | 9 | 10 | 11 | 12 |
| 3 | 2 | 3 | 4 | 5 | 6 | 7 | 8 | 9 | 10 | 11 |
| 4 | 1 | 2 | 3 | 4 | 5 | 6 | 7 | 8 | 9 | 10 |
| 5 | 0 | 1 | 2 | 3 | 4 | 5 | 6 | 7 | 8 | 9 |
| 6 | -1 | 0 | 1 | 2 | 3 | 4 | 5 | 6 | 7 | 8 |
| 7 | -2 | -1 | 0 | 1 | 2 | 3 | 4 | 5 | 6 | 7 |
| 8 | -3 | -2 | -1 | 0 | 1 | 2 | 3 | 4 | 5 | 6 |
| 9 | -4 | -3 | -2 | -1 | 0 | 1 | 2 | 3 | 4 | 5 |

$a + (10-b) - 5$

Fig. 2 a (COARSE VALUE)

| b (FINE VALUE) | 0 | 1 | 2 | 3 | 4 | 5 | 6 | 7 | 8 | 9 |
|---|---|---|---|---|---|---|---|---|---|---|
| 0 | 4 | 5 | 6 | 7 | 8 | 9 | 10 | 11 | 12 | 13 |
| 1 | 3 | 4 | 5 | 6 | 7 | 8 | 9 | 10 | 11 | 12 |
| 2 | 2 | 3 | 4 | 5 | 6 | 7 | 8 | 9 | 10 | 11 |
| 3 | 1 | 2 | 3 | 4 | 5 | 6 | 7 | 8 | 9 | 10 |
| 4 | 0 | 1 | 2 | 3 | 4 | 5 | 6 | 7 | 8 | 9 |
| 5 | -1 | 0 | 1 | 2 | 3 | 4 | 5 | 6 | 7 | 8 |
| 6 | -2 | -1 | 0 | 1 | 2 | 3 | 4 | 5 | 6 | 7 |
| 7 | -3 | -2 | -1 | 0 | 1 | 2 | 3 | 4 | 5 | 6 |
| 8 | -4 | -3 | -2 | -1 | 0 | 1 | 2 | 3 | 4 | 5 |
| 9 | -5 | -4 | -3 | -2 | -1 | 0 | 1 | 2 | 3 | 4 |

$a + (10-b) - 6$

INVENTOR:
HANSPETER KÜPFER

By Jacobi & Davidson
Attorneys

APPARATUS FOR DETERMINING AND INDICATING A DIGITAL MEASURING RESULT

BACKGROUND OF THE INVENTION

The present invention relates to an improved apparatus for determining and indicating a final digital-measuring result or value which is obtained from coarse, fine and very fine partial measurement values, each partial measurement value having more than one cipher or place.

In order to determine a physical magnitude with extremely great precision, measuring techniques are oftentimes employed which only deliver partial measurements. The total or final measuring valve must then be obtained from these partial measurements.

One such measuring technique is based upon determining how often a maximum or coarse unit of measurement appears in the value to be measured, how often a smaller or fine unit of measurement appears in the resulting remainder, and how often a still smaller or very fine unit of measurement appears in the still remaining remainder, and so forth. If additional digit places are ascertained during each partial measurement which are not taken into consideration or compensated during the determination of a remainder for the next partial measurement, then successive partial measurements will have overlapping or twice-determined ciphers or places. For example, a sample number having place values WXYZ could be determined by a three place coarse measurement responsive to place values WXY of the sample number and by a two place finer measurement responsive to place values YZ of the sample number. Thus, place value Y of the sample number overlaps during each partial measurement and is twice-determined. Naturally, the twice-determined place values of the finer partial measurement would be more exact than the corresponding cipher or place of the coarser measurement.

An apparatus is known to the art which determines and indicates the total measuring value from the determined partial measurement values, wherein the twice-determined or overlapping place value which results from the coarser partial measurement is corrected to increase the accuracy of the final measurement. In this regard, correction takes place in the following manner: Means are provided which ascertain the difference between the corresponding twice-determined place values of the coarser measurement and of the finer measurement and correct such in a manner that the overlapping place value derived by the smallest possible number of digital steps, such as the place value determined during the coarser measurement, is brought to the value of the finer measurement. The next coarser places of the coarse measuring result are adjusted by place value-transfer means or carryover within the coarse counter stage upon transition through the numeral zero. In other words, referring back to the example above, the place value Y of the coarse measurement WXY of sample number WXYZ is brought to the value of place value Y of the finer measurement YZ of the number WXYZ. The place values WX of the coarse measurement WXY will accordingly be adjusted by carryover from place Y to place X and from place X to place W. During the indicating operation, one of the twice-determined place values which have been corrected is covered, so that it will not be read twice in the final readout.

SUMMARY OF THE INVENTION

It is a primary object of the present invention to provide an improved apparatus for determining and indicating a digital, for example decadic, measuring result which has been obtained from coarse, fine and very fine partial measurement values, each partial measurement value having more than one cipher or place.

It is another object of the instant invention to provide a partial measurement apparatus utilizing only forward counting counter stages.

It is another object of the present invention to provide a counting apparatus having a minumum of additional components to effect correction of partial measurements.

It is another object of the present invention to provide counting apparatus which derives the criterium for correction of a partial measurement result from a single-counting operation.

A further object of the present invention is to provide a counting apparatus for the reception of an optional number of partial measurement values.

Now, in order to implement these and still further objects of the present invention which will become more readily apparent as the description proceeds, it will be understood that the inventive apparatus is manifested by the features that an auxiliary counting stage is connected in parallel through switch means with the coarsest counting stage of a fine partial measurement storage means during the counting-in of the fine partial measurement value. Thus, if the fine partial measurement storage means included a plurality of counters responsive to digit places X, Y and Z respectively of a sample number WXYZ, the auxiliary counter would be placed in parallel to the counter responsive to digit place X, the coarsest counting stage of the fine partial measurement storage means. The auxiliary counting stage provides an output signal whenever the internal counted or stored signal reaches a zero value. Furthermore, the coarse partial measurement storage means is preset by further switch means to a value of —5 or —6 respectively, prior to counting-in of the coarse partial measurement value. The difference between 10 and the value of the auxiliary counting stage is then transferred into the coarser partial measurement storage means by an inpulsing device which is controlled by the output signal of the auxiliary counting stage and which can be connected by means of the first-mentioned switch means to the auxiliary counting stage and to the coarser partial measurement storage means.

The inventive apparatus has the advantage that, in contradistinction to previous known techniques, no means are required for actually comparing the overlapping place values of the coarse and fine partial measurement storage means prior to correction. A further advantage of the inventive apparatus is realized in that only counting stages which count in one direction are required.

The inventive apparatus is based upon the concept that the criterium for the correction of the coarser partial measurement value can be derived from merely one-counting operation. This is the case since the overlapping or twice-determined place value $a$ of the coarse partial measurement value and the corresponding overlapping place value $b$ of the fine partial measurement value are counted or fed into a correction-counting circuit which undertakes the correction in the coarser partial measurement storage means on the basis of the result obtained in this correction-counting circuit alone. A particularly favorable physical construction is obtained if the coarser partial measurement storage means in simultaneously utilized as the correction-counting circuit, as such is contemplated by the inventive apparatus. The corrected partial measurement value appears in the coarse partial measurement storage means in that, from the place value $a$ which is stored in the coarse partial measurement means, the place value $b$ of the fine partial measurement storage means is subtracted and the value 5 or 4 added.

An example of a measurement in which the coarse-fine measuring technique is utilized is electronic distance measuring. As a measurement for distance, the transit time of transmitted electromagnetic oscillations is evaluated. The measuring techniques which are thus employed are sufficiently known. One such technique, for example, is described in U.S. Pat. No. 2,907,999 to which reference may be readily had.

It is assumed that during the measurement of a distance of 11,137 meters, for example, the following values result:

Coarse partial measurement value_____ 109
Fine partial measurement value_____ 137

The overlapping positional value in the coarse partial measurement storage is: $a = 9$. The overlapping positional value in the fine partial measurement storage is: $b = 1$.

The result of the counting operation in the coarser partial measurement value $a - b + 5$ or 4, Equation 1, or also $a (10-b) - 5$ or $-6$, Equation 2.

The performance of the counting operation according to Equation 2 has the advantage that only forwardly counting counting stages are necessary.

In the above-indicated counting example there now occurs correction of the coarse partial measurement value in a manner such that from the value $a = 9$, there is added the value $(10-b) = 9$ and the value 5 is subtracted. Hence, at the finest position of the coarse partial measurement value storage there appears the following result:

$a + (10 - b) - 5 = 9 + (10-1) - 5 = 13$.

Since a two-place number has been obtained as a result of the counting operation, there is a transfer of $+1$ to the second finest location or place in the coarse partial measurement value storage. In the coarse partial measurement value storage, there now appears the value 113. The finest position of the coarse partial measurement value is meaningless for the readout and is not utilized. There thus is given a measurement value of:

Coarse partial measurement value_____ 11̸3
Fine partial measurement value_____ 137
                                         ─────
                                         11137 m

BRIEF DESCRIPTION OF THE DRAWINGS

The invention will be better understood, and objects other than those set forth above will become apparent when consideration is given to the following detailed description thereof. Such description makes reference to the annexed drawings, depicting two embodiments of the inventive apparatus and wherein:

FIGS. 1 and 2 are result tables or charts of the correction-counting operation;

DESCRIPTION OF THE PREFERRED EMBODIMENTS

Turning now to the 1 as in FIGS. 1 and 2 there have been compiled in tables or charts the results of the correction-counting operation $a + (10-b) - 5$ and $a + (10) - 6$ as takes place in the coarse partial measurement storage means. The overlapping place values of the coarse and fine partial measurement storage means are labeled $a$ and $b$, respectively. Under $a$ there have been plotted the overlapping values of the coarse partial measurement and at $b$ there are plotted those overlapping values of the fine partial measurement. The two-digit results cause a correction in the positive sense, the negative results cause a correction in the negative sense. The remaining results cause no correction. During a correction in the positive or negative sense, the place value contained in the counting stage of the second smallest unit of the coarse partial measurement storage means is increased or decreased, respectively, by one unit.

From FIGS. 1 or 2, it can be recognized for which combinations of the overlapping place values $a$ and $b$ corrections are undertaken.

The numerals 5 or 6 in Equation 2 gives the correction-criterium-limits with respect to the place values $a$ and $b$ Since, as assumed, the error of a partial measurement is not greater than four of the smallest units, only such overlapping values are to be taken into consideration for the correction which at most differ by four units (eg. $a = 4$, $b = 0$ or $a = 6$, $b = 0$). Therefore, results of 10 and zero in FIG. 1 and results such as $-1$ and 9 in FIG. 2 cannot appear at all. The resultant corrections shown in FIGS. 1 and 2 are identical, because the two-digit results and the negative results are at the same places.

Figure 3:
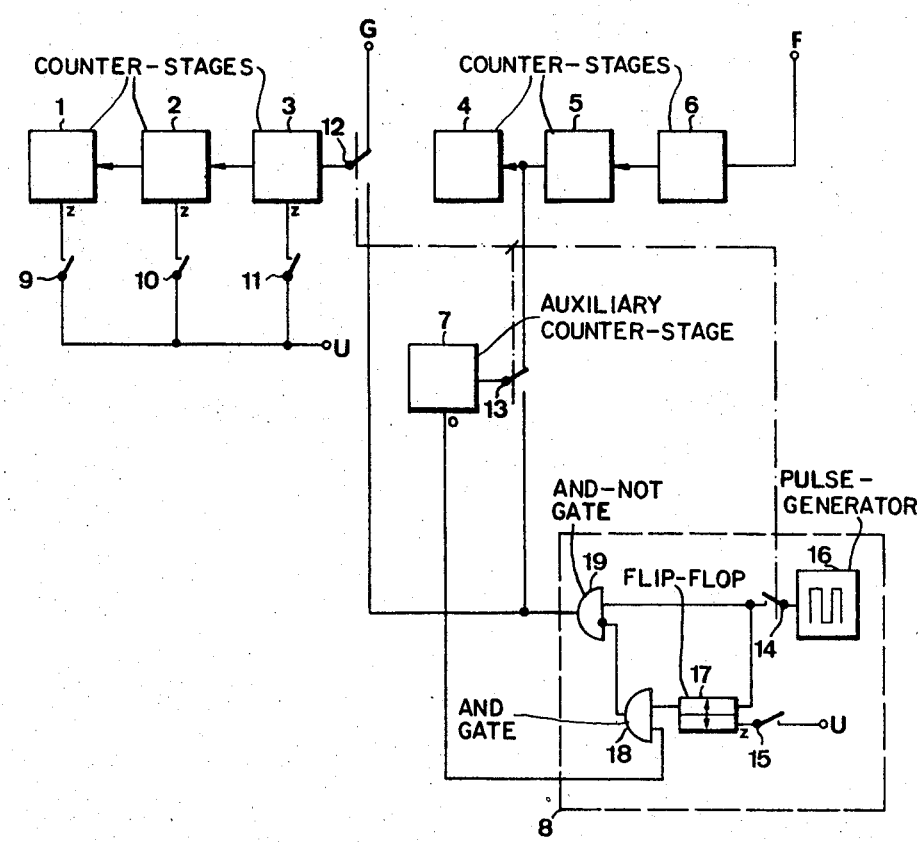
FIG. 3 schematically depicts an inventive apparatus for determining the final digital measuring result from a fine and a coarse measurement value.

FIG. 3 depicts an apparatus for determining a final measuring result from a respective coarse and fine partial measurement which overlap by one place as discussed above, and wherein the correction of the coarse partial measurement value is obtained by means of a counting operation.

The electrically interconnected decadic counting or counter stages 1, 2, 3 or 4, 5, 6, respectively, each represent a three-place or three-position partial measurement storage means. Of the counted-in or infed partial measurement values at the inputs G or F of the counting stages 1, 2, 3 and 4, 5, 6, respectively, there is stored in the counting stages 1 or 4 the hundreds value, in the counting stages 2 or 5, the tens value, and in the counting stages 3 or 6 the units value. The counting stages 1 and 2 are presettable to the place value 9 and the counting stage 3 is presettable to the place value 5 in that setting voltage is applied from the voltage source U through the switches 9, 10 and 11 to the junctions or connections Z.

The auxiliary counting stage 7 can be connected by means of the selector or double-throw switch 13 with the input of the counting stage 4 or with the output of the impulse transmitter or impulsing device 8 which simultaneously is coupled via the switch 12 with the input of counting stage 3 of the coarse partial measurement storage means. The auxiliary counting stage 7 possesses a null value-output 0 which delivers an output signal potential during the internal place value null or zero of this stage. The switch contacts 9 to 15 are actuated by a nonillustrated programming transmitter or device. The impulse transmitter or impulsing device 8 consists of a pulse generator 16, a flip-flop stage 17, an AND-gate 18 as well as an AND-NOT-gate 19. The pulse generator 16 is coupled via a switch 14 with the "direct" input of the AND-NOT-gate 19 and with the input of the flip-flop stage 17. This flip-flop stage 17 can be placed in an output state or condition which is electrically neutral, hereinafter referred to as "electrically neutral or dead," in that the voltage U is connected via the switch 15 to the input Z. A connection leads to the "inverted" input of the AND-NOT-gate 19 through the output of the AND-gate 18. This AND-gate 18 is connected at one of its inputs with the output of the flip-flop stage 17 and at the other of its inputs with the null value-output signal terminal 0 of the auxiliary counting stage 7.

The impulsing device 8 serves to deliver pulses to the auxiliary counting stage 7 and the counting stage 3 of the coarse partial measurement storage means as soon as the switch 14 is closed, and specifically for such length of time until an output signal potential appears at the null value-output 0 of the auxiliary counting stage 7. A particular characteristic of the circuit resides in the fact that the delivery of pulses also begins when the auxiliary counting stage 7 internally stores a place value null or zero. Therefore, in every case, a number of pulses are transmitted which correspond to the difference between 10 and the internal place value storage of the auxiliary counting stage 7.

The inventive apparatus depicted in FIG. 3 functions as follows:

A number of pulses which are proportional to the fine partial measurement value are delivered via the input F to the counting stage 6 of the fine partial measurement storage means. The input of the auxiliary counting stage 7 is connected in parallel to the input of the hundreds-counting stage 4 by means of the switch 13. This results in the overlapping place value $b$ likewise being counted into the auxiliary counting stage 7 as well as counting stage 4. A number of pulses which are proportional to the coarse partial measurement value arrive via the input G and the switch 12 at the input of the coarse partial measurement storage means. The coarse partial measurement storage means has been previously preset to the value −5, which, in this three-positioned storage means, corresponds to the value 995. Accordingly, there is stored in the counting stage 3 of the coarse partial measurement storage means the overlapping place value $a$ reduced by the presetting, which corresponds to the value $(a-5)$.

Now, in order to trigger the correction-counting operation, the switches 12, 13 and 14 are thrown. The pulse generator 16 delivers pulses via the AND-NOT-gate 19 to the auxiliary counting stage 7 and to the counting stage 3 of the coarse partial measurement storage means until the null value-output terminal 0 of the auxiliary counting stage 7 delivers a signal voltage and blocks the pulse transmission through the AND-gate 18 and the AND-NOT-gate 19. In so doing, the flip-flop stage 17 is flipped by the first pulse of the pulse generator 16 and delivers at its output a signal potential to the input of the AND-gate 18. The AND-gate 18 then delivers an output itself as soon as signal voltage is delivered from the null value-output terminal 0 of the auxiliary counting stage 7 to the other input of the AND-gate 18. The output from the AND-gate 18 serves to block AND-NOT-gate 19. During the correction operation, the auxiliary counting stage 7 is counted from the stored value $b$ to a null or zero value by pulses from the impulsing device 8, wherein, the required number of pulses for this purpose are likewise counted into the coarse partial measurement storage means through counter 3. Consequently, in the coarse partial measurement storage means, the value $(10-b)$ is added to the already stored value $(a-5)$. Accordingly, there is stored in the counting stage 3 of the coarse partial storage means the unit place of the result plotted in FIG. 1 and an eventual correction of the counting stage 2 and also the counting stage 1 by means of transfers or carryovers is undertaken.

A correction of the coarse partial measurement value in the negative sense is achieved in that the value-reduction of the stage 2 due to the presetting of the partial measurement storage means to the value 995 is not compensated by counting in the value $a+(10-b)$, since no transfer or carryover occurs. No correction of the coarse partial measurement value takes place when the place value reduction of the stage 2 due to the presetting is compensated because of a place transfer or carryover during the counting in of the value $a+(10\ b)$ occurs. A correction in the positive sense results when two place transfers or carryovers occur at the counting stage 2 because of the counting-in of the value $a+(10-b)$.

The indicating of the stored final corrected digital-measuring result can be carried out by the counting stages if such are appropriately constructed for this purpose, or else separate indicating devices can be provided in which the measured value is transmitted. The value of the counting stage 3 is not taken into consideration during the indication or reading.

Figure 4:
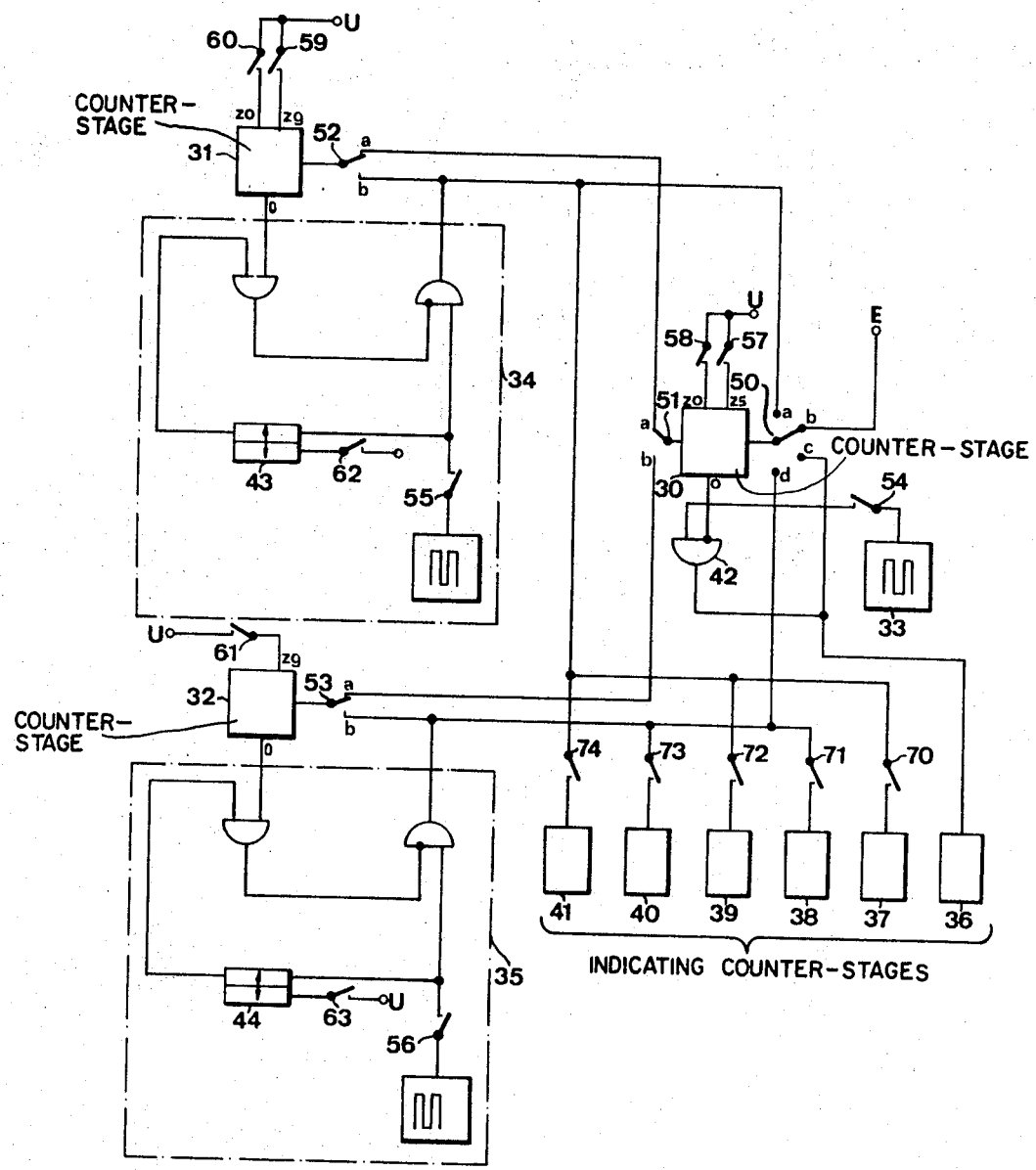
FIG. 4 depicts a second embodiment of the inventive apparatus in which a partial measurement-intermediate storage is connected between the input and the indicating counting stages.

A second embodiment of the inventive apparatus is depicted in FIG. 4. In this circuit a partial measurement intermediate storage means is electrically connected between the input E and the indicating counting stages 36 to 41. At this partial measurement intermediate storage means, the pulses are counted and the partial measurement value is briefly stored for the purpose of correction. The two-digit or two-position intermediate storage means is formed by three decadic counting stages 30, 31 and 32. The coarsest place value of the intermediate storage means can be provided by either of the counting stages 31 and 32. Either the counting stage 31 or 32 is connected together with the counting stage 30 by means of the contacts 51 and 52 or 51 and 53, respectively, to form the two-digit or two-position intermediate storage means. The counting stages 31 and 32 are each electrically coupled with a respective impulse transmitter or impulsing device 34 and 35. The output of the impulsing device 34 leads via the contact 52 to the counting stage 31, via the contact 50 to the input of the intermediate storage means, and via the contacts 70 or 72 or 74 to an indicating counting stage. The output of the impulsing device 35 leads via the contact 53 to the counting stage 32, via the contact 50 to the input of the intermediate storage means, and via a contact 73 or 71 to an indicating counting stage. The indicating counting stages are constructed to count backwards. The counting stages 30, 31 and 32 are presettable in that voltage can be applied to the terminals or conductors z0, z5 or z9 by means of the contacts 57, 58, 59, 60, or 61. Furthermore, a pulse transmitter 33 is provided which is connected via the switch 54 with the "direct" input of the AND-NOT-gate 42, the "inverted" input of which leads to the null value- output terminal 0 of the counting stage 30. At the output of the AND-NOT-gate 42, the indicating counting stage 36 is connected, and via the contact 50, the counting stage 30. The contacts 50 and 74 are controlled by a nonillustrated programming device or a programming transmitter e.g., by a cam shaft.

The apparatus depicted in FIG. 4 has the advantage that it can be constructed for the reception of an optional number of partial measurement values. For each additional partial measurement, it is only necessary to connect a further indicating counting stage. The determination and indication of a measurement result with this inventive apparatus takes place in the manner to be described hereinafter. The position of the switch contacts of the programming device is only mentioned for the position which differs from that shown in the drawing during the subsequent description of the fixedly programmed operations.

Presetting for the counting-in: The counting stages 30 and 31 are adjusted to the value null or zero by closing the contacts 58 and 60 respectively.

Counting-in: The number of pulses which are proportional to the fine partial measurement value arrive via the input E and the switch 50 at the counting stage 30 in which the unit value of the partial measurement is stored. The pulses corresponding to the tens unit of this partial measurement are delivered from the counting stage 30 via the switches 51 and 52 to the counting stage 31.

Counting-out: The contact 50 is in position $c$ the contacts 51 and 53 are in position $b$ and the contact 54 is closed. Pulses are delivered from the pulse transmitter sender 33 via the switch 54 to the "inverted" input of the AND-NOT-gate 42. If the counting stage 30 does not internally store the value null or zero, then the null position output signal terminal 0 is electrically neutral or dead. In this case, the pulses can pass the gate 42 and arrive not only at the counting stage 30 but also at the indicating counting stage 36 in which the finest units are indicated.

Presetting for counting-in and correction: The contact 50 is in position $a$, the contacts 51 and 52 are in position $b$, the contacts 57, 61 and 62 are closed. The counting stage 30 is adjusted to 5, the counting stage 32 to 9, and the flip-flop stage 43 is adjusted to be electrically neutral or dead.

Counting-out and transfer: The contact 50 is in position $a$, the contacts 51 and 52 are in position $b$. The contacts 55 and 70 are closed. The impulsing device 34 delivers a number of pulses corresponding to the difference between 10 and the value stored in the counting stage 31. These pulses arrive at the counter 31, at the indicating counting stage 37, and at the counting stage 30. During this operation, the difference $(10-b)$ is formed with the aid of the counting stage 31 acting as the auxiliary counting stage and such is transmitted to the intermediate storage means which has been preregulated to −5. In the indicating counting stage 37, the second finest units are indicated.

Counting-in and correcting: The contact 51 is in position $b$. Now, if during this counting operation there is counted into the counting stages 30 and 32 the next coarser partial measurement value, then there is formed in the counting stage 30 the result $a+(10-b)$ — with possible transfer into the counting stage 32, whereby the correction of this partial measurement value takes place.

Presetting for the counting-in and correction: The contact 50 is in position $d$, the contact 53 is in position $b$. The contacts 57, 59 and 63 are closed. The counting stage 30 is adjusted to 5, the counting stage 31 to 9, and the flip-flop stage 44 is adjusted to be "electrically neutral or dead."

Counting-out and transfer: The contact 50 is in position *d*. The contact 53 is in position *b*. The contacts 56 and 71 are closed. The impulsing device 35 delivers a number of pulses corresponding to the difference between 10 and the value stored in the counting stage 32. These pulses arrive at the counting stage 32, at the indicating counting stage 38, and at the counting stage 30. During this operation there is formed the difference (10 − *b* with the aid of the counting stage 32 functioning as the auxiliary counting stage and such is transmitted to the intermediate storage means preset at −5. In the indicating counting stage 38, there are indicated the third-finest units.

For each further partial measurement, the following operations are repeated in analogous manner: counting-in and correction, presetting for the counting-in and correction as well as the counting-out and transfer. In so doing, the operations are alternately carried out via the intermediate storage means consisting of the counting stages 30 and 31 and that consisting of the counting stages 30 and 32.

The apparatus can also be constructed for nondecadic counting systems. In such case, the presetting of the coarser partial measurement storage means and the formation of the difference (*a* − *b*) then takes place in a manner corresponding to the system.

While there is shown and described present preferred embodiments of the invention, it is to be distinctly understood that the invention is not limited thereto but may be otherwise variously embodied and practiced within the scope of the following claims. ACCORDINGLY,

I claim:

1. In an apparatus for determining and indicating a digital measurement result composed of a plurality of at least two-digit partial measurements which are derived from coarse, fine and very fine partial measurements, said two-digit partial measurements overlapping by at least one-digit place with the next coarser and the next finer partial measurement values, respectively, and possessing an error not greater than ± four of the lowest units of the relevant partial measurement value, wherein multipositional partial measurement storage means are provided for the partial measurement values, said storage means being composed of a number of counting stages corresponding to the number of digit places of the partial measurement value and being connected with means which in the presence of a difference between two overlapping digit place values, undertake a correction of the coarser of the two partial measurement values, and wherein only a respective one of the two overlapping digit places is indicated, the improvement comprising:

auxiliary counting means providing an output for a null value internal stored count, said auxiliary counting means having an input;

first switch means for connecting said input of said auxiliary counting means in parallel with the coarsest counting stage of the finer partial measurement storage means during counting-in of the finer partial measurement value;

second switch means for presetting the coarser partial measurement storage means to a value between − 5 and − 6 inclusive prior to counting-in of the coarser partial measurement value; and transfer means for transferring the difference between ten and the internal stored count of said auxiliary counting means into said coarser partial measurement storage means, said transfer means including an impulse device controlled by said output of said auxiliary counting means and connected to said input of said auxiliary counting means and to said coarse partial measurement storage means.

2. The improvement defined in claim 1, wherein said impulse device comprises:

a pulse generator;

flip-flop means having an input connected to said pulse generator and an output;

an AND-gate having first and second inputs and an output, said first input being connected to said output of said auxiliary counting means, said second input being connected to said output of said flip-flop means; and an AND-NOT-gate having an inverted input, a direct input, and an output, said inverted input being connected to said output of said AND-gate, said direct input being connected to said pulse generator, and said output being connected to said input of said auxiliary counting means and to said coarse partial measurement storage means.

3. The improvement as defined in claim 2, wherein said multipositional partial storage means comprises an indicating partial measurement storage means, said multipositional partial measurement intermediate storage means for briefly storing partial measurement values provided between the input for said partial measurement values and said indicating partial measurement storage means; means for transferring said briefly stored partial measurement values from said intermediate partial measurement storage means to said indicating partial measurement storage means; said intermediate partial measurement storage means being provided with two counting stages for alternately storing the coarsest units of said briefly stored partial measurement values, said two counting stages each including an impulse device and being connected via switch means with said input of said intermediate partial measurement storage means and with an associated counting stage of said indicating partial measurement storage means.

4. The improvement as defined in claim 3, wherein said switch means is controllable by a programming device.